United States Patent [19]

Totten

[11] Patent Number: 4,958,784
[45] Date of Patent: Sep. 25, 1990

[54] COLLAPSIBLE SPOOL HOLDER FOR FISHING LINE

[76] Inventor: David Totten, 3125 S. Virginia, #3, Reno, Nev. 89502

[21] Appl. No.: 401,123

[22] Filed: Aug. 31, 1989

[51] Int. Cl.$^5$ .................................................. B65H 49/20
[52] U.S. Cl. .................................. 242/129.6; 242/106; 242/129.8; 242/156
[58] Field of Search .................... 242/129.6, 134, 139, 242/141, 106, 129.5, 55.2, 104, 129.8, 156, 156.1, 156.2

[56] References Cited

U.S. PATENT DOCUMENTS

| | | | |
|---|---|---|---|
| 1,711,353 | 4/1929 | Johnson | 242/55.2 |
| 2,903,196 | 9/1959 | Fowler | 242/104 |
| 3,647,155 | 3/1972 | Jorgenson | 242/106 |
| 3,696,697 | 10/1972 | Hoffman | 242/129.5 |
| 4,022,394 | 5/1977 | Gudde | 242/129.6 |
| 4,059,243 | 11/1977 | Hartley | 242/129.6 |
| 4,151,966 | 5/1979 | Lindsay | 242/106 |
| 4,540,136 | 9/1985 | Rauch | 242/106 |
| 4,776,527 | 10/1988 | Prowant | 242/106 |
| 4,795,107 | 1/1989 | Williams | 242/106 |

Primary Examiner—Stanley N. Gilreath
Attorney, Agent, or Firm—Sughrue, Mion, Zinn, Macpeak & Seas

[57] ABSTRACT

The collapsible spool holder consists of a base plate, two pivot arms, two pins to hold the arms on the sides of the base plate and a shaft that snaps into the pivot arms. It is used to hold fishing line spools so as a person can replenish the fishing line on the reel of their poles. First one screws the base plate onto a hard, smooth surface (tackle box, boat, etc.), then the shaft is snapped out of the pivot arms. Next the shaft is inserted into the middle of the spool and snapped back into the slots of pivot arms. The product stays stationary so as one could unwind the fishing line from the spool which rotates with its flanges in contact with the relieved radius or shallow concave groove upon pivoting of the arms under gravity influence onto the reel of one's fishing pole.

5 Claims, 1 Drawing Sheet

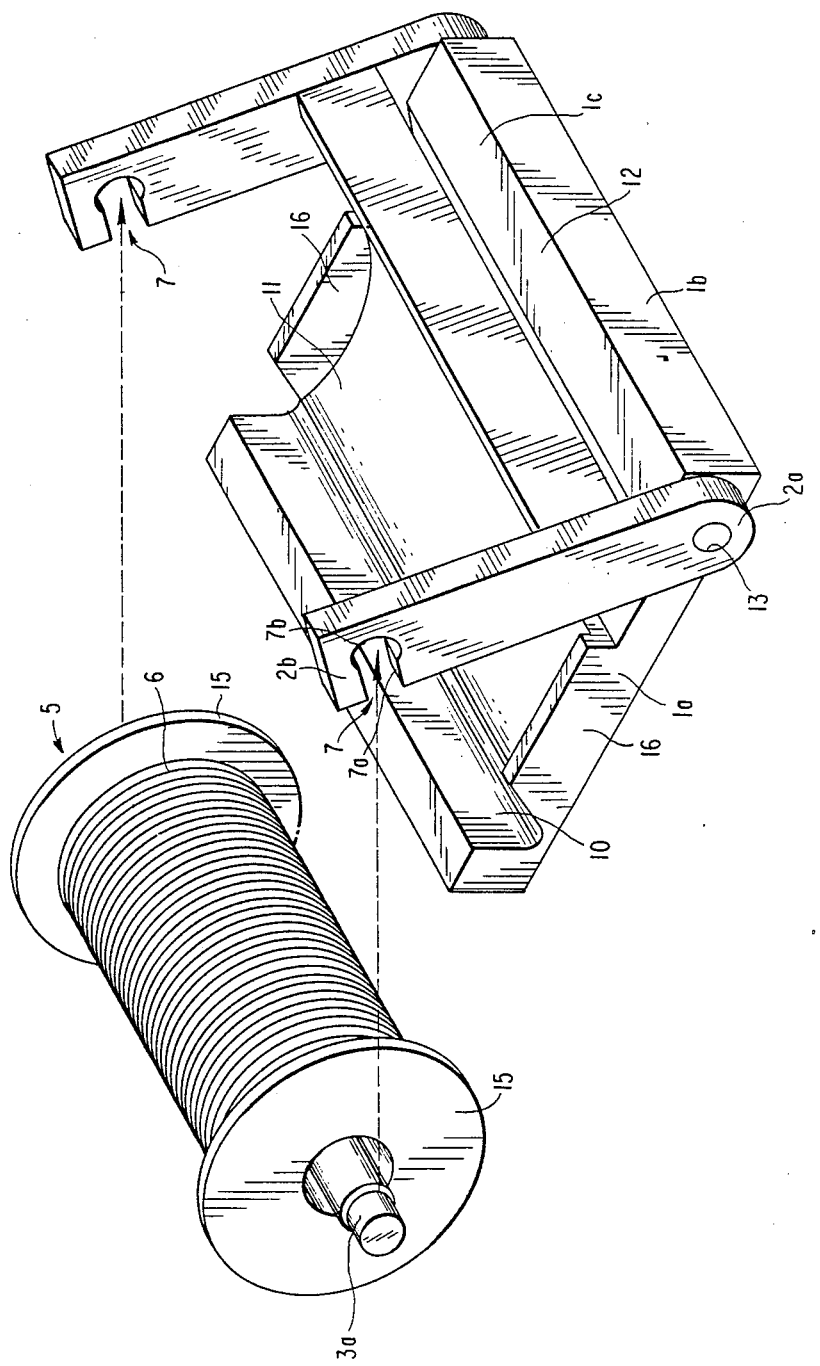

COLLAPSIBLE SPOOL HOLDER FOR FISHING LINE

BACKGROUND OF THE INVENTION

This invention relates to a spool holder for holding a spool of fishing line for supporting the spool for rotation about its axis while winding the fishing line from the spool onto a fishing reel, and more particularly to a collapsible spool support which supports the reel by its circular disc flange for rotation about the reel axis during unreeling of the line.

DESCRIPTION OF THE PRIOR ART

In the past when a person was fishing and needed to put fishing line on the reel of their fishing pole they had to use another person to hold the spool of fishing line by way of a pencil or stick. This invention puts an end to that.

SUMMARY OF THE INVENTION

This invention involves a flat planar base rotatably supporting a pair of arms to opposite sides at one end which pivot from a horizontal in-line position to a raised oblique position. A cylindrical shaft is inserted into the middle of a spool holding fishing line and the ends of the shaft are snapped into notches within the ends of the pivot arms remote from the base. The circular flanges to opposite sides of the spool rest within a concave recess within an upper face of the base permitting the reel to rotate on the shaft during removal of fishing line from the spool. Thus the spool of line is held so as to make it fairly easy to wind up the line onto the reel. The base can be screwed on to the side of a boat, tackle box, or any other surface.

BRIEF DESCRIPTION OF THE DRAWINGS

The single FIGURE is an exploded perspective view of the collapsible spool holder for a fishing line forming a preferred embodiment of the invention.

DESCRIPTION OF THE PREFERRED EMBODIMENT

The collapsible spool holder indicated generally at 14 forming a preferred embodiment of the invention consists of base plate 1, two pivot arms 2 and a removable shaft 3. The base plate 1 may be screwed onto any hard surface. The shaft 3 is snapped out of the pivot arms 2 and inserted axially into a hollow spool 5 holding fishing line 6. Reduced diameter ends 3a of shaft 3 are snapped back into slots 7 in the outboard ends 2b of pivot arms 2 via a narrowed entry portion 7a of the slot and an enlarged circular terminal portion 7b of that slot in each arm 2.

A pin 4 pivots the inboard ends 2a of the arms to opposite sides 1a of the base 1 adjacent the one end 1b of the base. Next, an end of line 6 is wrapped on a reel (not shown) and one continues turning the reel until the reel is replenished with fishing line 6. The line 6 is cut and threaded to the eyes (not shown) of the fishing pole (not shown) and one is ready for some fishing.

The base plate 1 is approximately 80 mm×73 mm and of given thickness. Base plate 1 has two mounting holes (not shown) and a relieved "V" groove 10 that is approximately 8.5 mm wide and extends the width of the base to receive shaft 3 when arms 2 are lowered from the oblique position shown. It has a relieved radius or shallow concave groove 11 within upper face 1c whose center is at 53.3 mm from the center of 0.5 mm diameter holes (not shown) and extends all but 2.6 mm of each side 1a of base plate 1. The 0.5 mm diameter holes (not shown) are located 6.4 mm from the right end 1b of the plate and are spaced apart 6.4 mm.

The pivot arms 2 are 4.7 mm thick. Both arms are 77.5 mm long and 12.8 mm wide. The arms 2 are joined by a 74 mm×12.4 mm cross bar 12 which causes the pivot arms 2 to overlap base 1. The arms 2 have two 4.8 mm holes 13 which receive pin 4. The arms 2 have slots indicated generally at 7 opening transversely from one side and which are located approximately 63.5 mm from holes 13 and are 12.8 mm wide. The pin 4 has a diameter of 4.8 mm and passes through 6.0 mm radius hole (not shown) in base 1 so pivot arms 2 will not bind when pivoting.

The spool shaft 3 is approx. 83.6 mm long×8 mm in diameter. The spool shaft 3 is relieved on both ends at 3Q 5.4 mm×6.3 mm, so that the spool shaft will snap onto arms 2 at slots 7.

With the spool 5 supported by shaft 3, having the ends 3a of the shaft snapped into slots 7, the weight of the spool 5 and line 6 causes the arms 2 to pivot downwardly from the oblique position shown slightly until the peripheries of flanges 15 at opposite sides rest within the concave groove 11 between lateral raised, vertical side wall 16 such that the spool 5 rotates about its axis. The force of gravity rotates the arms 2 until the flanges 15 rest within the concave groove 11.

With the spool 5 removed, and with the shaft 3 snapped into the arms 2 at opposite ends 3a, the arms pivot into a horizontal orientation with the shaft 3 positioned within the "V" groove 10.

The roll pin 4 is 4.8 mm is diameter×12.7 mm long. The roll pin 4 is used to connect arms 2 to base 1.

The present invention eliminates the problems of putting fishing line on a reel of a fishing pole. One can relax and enjoy oneself for which one goes fishing in the first place.

The collapsed spool holder of the present invention could be molded into a tackle box to make it just a little bit easier to use.

I claim:

1. A collapsible spool holder comprising a planar base plate, a pair of pivot arms pivotably mounted at one end to said base plate at one end thereof for pivoting into upwardly oblique position, to respective opposite sides of said base plate, a shaft removably mounted to the ends of said arms remote from said pivot connection to said base, said shaft projectable through a hollow spool bearing fishing line for rotatably mounting said spool to the ends of said arms, and wherein said base plate includes a concave groove within the upper face thereof positioned to receive the spool and support the spool for rotation about its axis to facilitate unwinding of the fishing line from the periphery of the spool received within the concave groove under gravity influence causing the arms to rotate downwardly towards the base plate due to the weight of the spool and the fishing line thereon.

2. The collapsible spool holder as claimed in claim 1, wherein said base plate includes within the upper face thereof a V-shaped groove adjacent said concave groove and in line with the shaft carried by said arms, such that absent said spool said arms rotate to a horizontal position adjacent the opposed sides of the base plate with the shaft positioned within said V-shaped groove rendering said collapsible spool holder compact for travel or repositioning.

3. The collapsible spool holder as claimed in claim 1, wherein the ends of said arms remote from said pivot connection to said base include transverse slots of a width slightly less than the diameter of opposite ends of said shaft, with said transverse slots terminating in a circular portion of a radius in excess of the diameter of said shaft ends, whereby the ends of said shaft are snap-fitted into said transverse slots, thereby permitting the shaft to rotate about its axis within said ends of said arms bearing said transverse slots, and wherein said shaft ends of a reduced diameter, whereby said shaft is prevented from shifting axially within said circular portions of said transverse slots and additionally prevented from retraction through said narrowed portion of said slots, thereby retaining said shaft subsequent to snap-coupling of the shaft at opposite ends to respective arms.

4. The collapsible spool holder as claimed in claim 3, wherein the ends of said arms remote from said pivot connection to said base include transverse slots of a width slightly less than the diameter of opposite ends of said shaft, with said transverse slots terminating in a circular portion of a radius in excess of the diameter of said shaft ends, whereby the ends of said shaft are snap-fitted into said transverse slots, thereby permitting the shaft to rotate about its axis within said ends of said arms bearing said transverse slots, and wherein said shaft ends of a reduced diameter, whereby said shaft is prevented from shifting axially within said circular portions of said transverse slots and additionally prevented from retraction through said narrowed portion of said slots, thereby retaining said shaft subsequent to snap-coupling of the shaft at opposite ends to respective arms.

5. The collapsible spool holder as claimed in claim 1, wherein said hollow spool includes circular disc flanges at opposite ends thereof, and wherein said concave groove within the upper face of said base plate has a radius generally equal to the radius of said spool flanges such that the flanges in contact with the concave groove facilitate rotation of the spool about its axis during removal of the fishing line from the spool.

* * * * *